INVENTORS
JOHN L. BARKER
BERNARD J. MIDLOCK
BY
Edward H. Eames
ATTORNEY

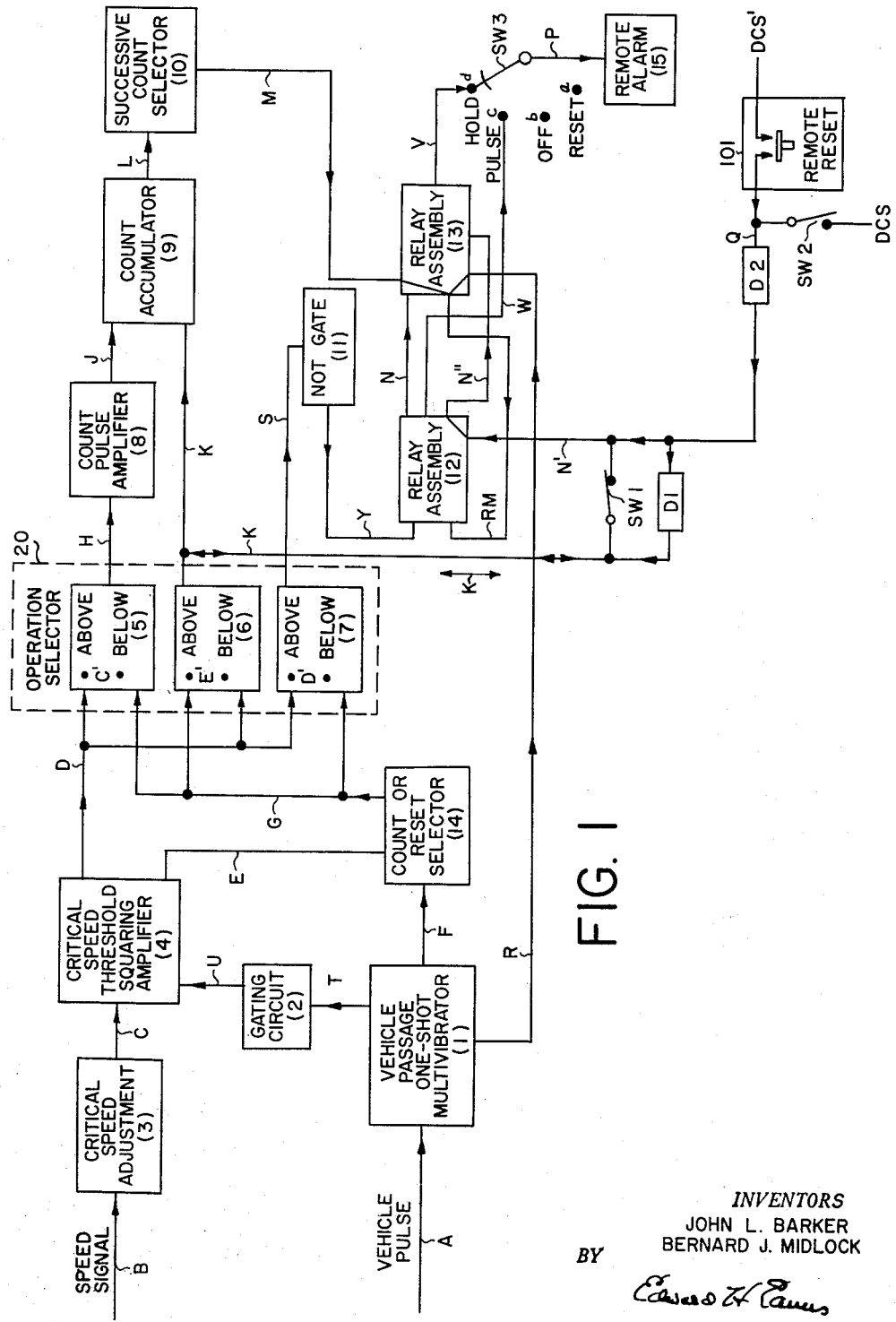

March 6, 1962  J. L. BARKER ET AL  3,024,443
TRAFFIC SPEED MONITOR
Filed Dec. 2, 1958  3 Sheets-Sheet 3

INVENTORS
JOHN L. BARKER
BERNARD J. MIDLOCK
BY
Edward W. Cairns
ATTORNEY

United States Patent Office 3,024,443
Patented Mar. 6, 1962

3,024,443
TRAFFIC SPEED MONITOR
John L. Barker and Bernard J. Midlock, Norwalk, Conn., assignors, by mesne assignments, to Laboratory For Electronics, Inc., Boston, Mass., a corporation of Delaware
Filed Dec. 2, 1958, Ser. No. 777,711
24 Claims. (Cl. 340—31)

The present invention is concerned with the monitoring of vehicle speed and determining the relation of the monitored speed with respect to a pre-selected speed.

The pre-selected speed, which by way of example may be between 0 and 100 miles per hour, may be considered a threshold for "critical speed," and the speed may be considered "critical" if below the pre-selected speed in one mode of operation and may be considered "critical" if above the pre-selected speed in another mode of operation.

From one aspect, the present invention may be used as part of a traffic monitoring system, with the present invention particularly employed to determine and indicate the relation of vehicular speeds to a pre-selected speed for vehicles traveling along a normally unobstructed thoroughfare, such as a throughway, expressway or freeway, or a highway from which cross traffic has been virtually eliminated, although the invention may have application also to ordinary highways or streets at some locations.

The present invention would receive passage and speed information on a vehicle or individual vehicles of a succession of vehicles from apparatus designed for obtaining such information at a traffic sampling station for example.

Apparatus which may be employed for obtaining such passage and speed information is described and illustrated as part of a co-pending patent application, Serial Number 732,248, entitled "Traffic Monitoring System," filed May 1, 1958 by John L. Barker, one of the co-inventors herein and assigned to Eastern Industries, Incorporated, the assignee of the present application as originally filed. The Model RS1 Radar Sensing Unit and Model M107 Speed and Impulse Translator, manufactured by said assignee, illustrate means cooperating for providing such information in the form of traffic speed representing voltages and the traffic passage pulses or brief switching operations which may serve as inputs to the circuitry of the present case and may be used in combination with it.

Apparatus used to detect the passage and speed of a vehicle and to translate the information into a detection or passage pulse and a speed pulse, with the speed pulse calibrated in D.C. voltage, such as disclosed in the said co-pending application for example, is assumed to provide the passage pulse and the speed representing voltage pulse at the input circuits in connection with the present invention. It is also understood that a D.C. voltage amplifier will be employed to amplify the voltage output of the speed pulse from any low voltage level, such as the 0 to 10 volts D.C. output in the Model 107 Speed and Impulse Translator mentioned above, to 0 to 100 volts D.C., which the present invention is designed to use at its input in its preferred form, for example.

The present invention may be employed in a traffic monitoring system or in a traffic control system, described below.

The present invention may indicate through alarm, signal, or otherwise that the speed of a vehicle or a succession of vehicles is "Above" a pre-selected or threshold speed or may similarly indicate that the speed of such vehicle or vehicles is "Below" a pre-selected or threshold speed as desired by selection of one of the two modes of operation by a ganged switch designed for such selection. With the "Operation Selector" switch in the "Above" position, the present invention will indicate that the monitored speed is in excess of, that is "Above," the pre-selected speed. Consecutively registered critical speeds will be accumulated and counted up to a pre-determined limit while the monitored speed of a vehicle which is not critical, that is at or below the pre-selected speed, will be indicated as not critical and may reset the count accumulator when operating in this mode.

With the "Operation Selector" switch in the "Below" position, all monitored vehicle speeds below the pre-selected speed will be indicated as critical, while monitored vehicle speeds at or above the pre-selected speed will be indicated as not critical and may reset the count accumulator.

Each time a monitored speed is received that is considered critical, whether the "Operation Selector" is positioned in the "Above" or the "Below" position, an indication of the same is received in the form of an illumination of a lamp, this lamp is identified hereinafter as "Critical Speed Indicator Lamp."

It is an object of the present invention to provide for selection between vehicle speeds above or below a pre-selected speed to give indication of the same.

Another object is to provide apparatus for determination and accumulation of consecutive vehicle speeds that are considered critical when the speeds are above the pre-selected speed.

A still further object is to provide apparatus for determination and accumulation of consecutive vehicle speeds that are considered critical when the speeds are below the pre-selected speed.

A further object is to provide for accumulation and counting of consecutive critical speeds up to a desired limit and to indicate the same through alarm or otherwise.

Another object is to provide for internal reset of the accumulating and counting means upon determination that a speed is to be considered not critical.

A still further object is to provide for internal reset of the output circuits or alarm circuits upon determination that a speed is to be considered not critical.

Other objects of the invention will be apparent in the following description and the appended claims with reference to the accompanying drawings in which:

FIG. 1 is a block diagram of the present invention, which is schematically illustrated in FIGS. 2a and 2b.

Referring now to FIG. 1 in more detail, the several blocks comprising the block diagram of FIG. 1 are identified by name and numbered. Each block in FIG. 1 represents a part of the circuit diagram of FIGS. 2a and 2b, that are blocked off in broken line blocks, and numbered with similar numbers.

Figure 2A:
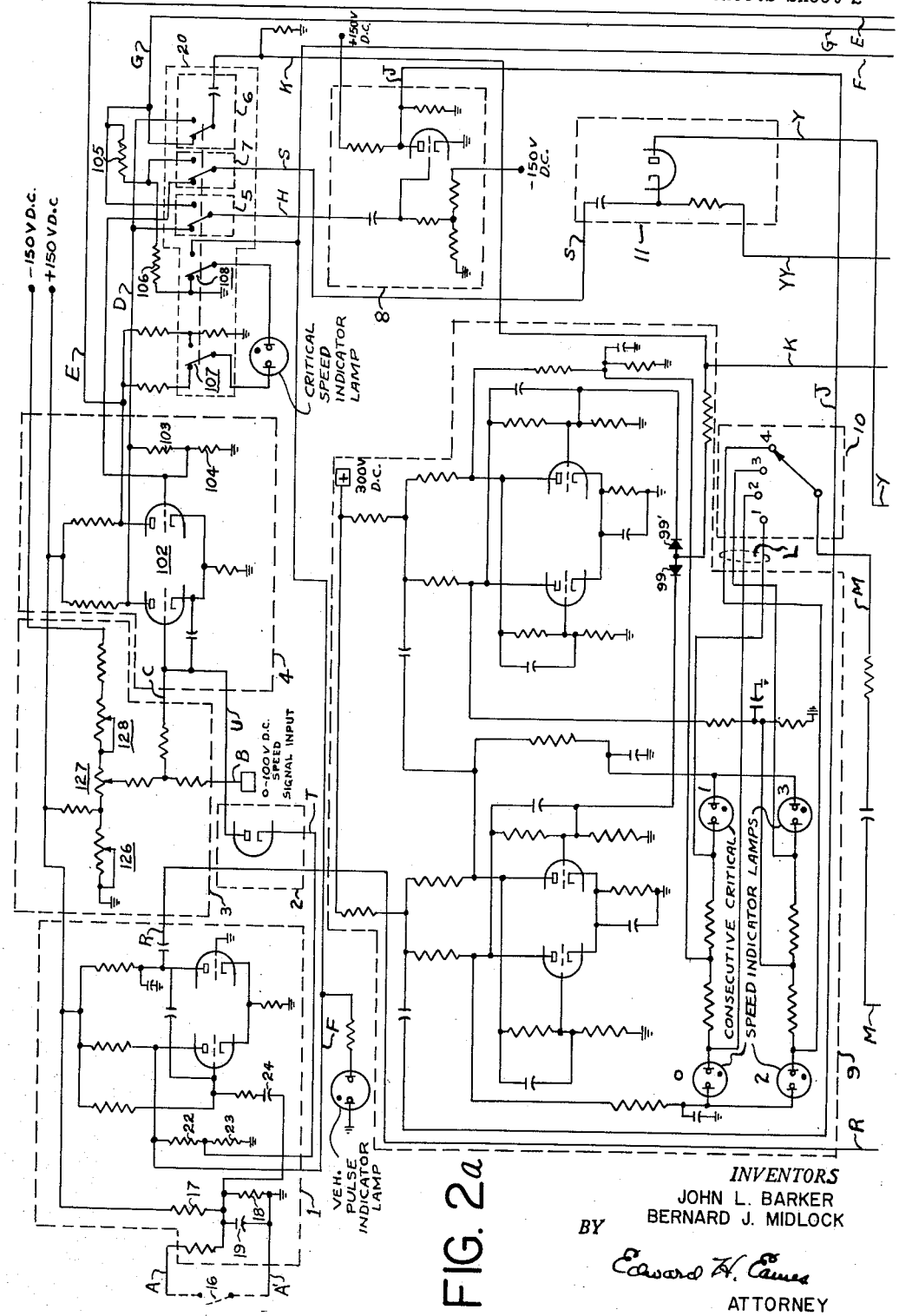
FIGS. 2a and 2b is a schematic circuit diagram of the preferred form of the present invention arranged in two parts and may be fitted together with FIG. 2a above FIG. 2b.
Figure 2B:
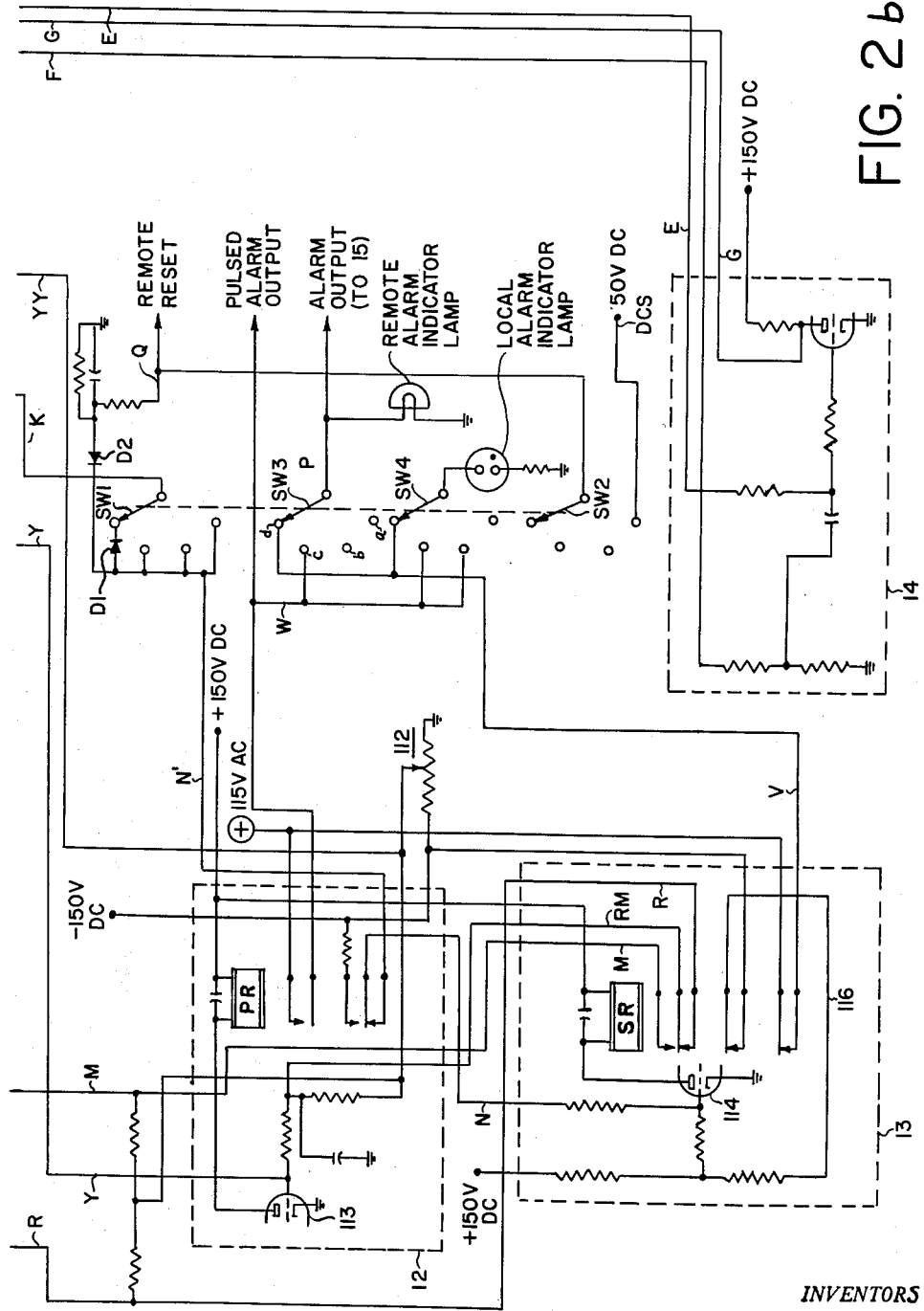

The several lines in FIG. 1, individually identified by a letter, represent the similarly lettered leads in FIGS. 2a and 2b.

The input to the "Vehicle Passage One-Shot Multivibrator," identified as block 1, is a brief connection of line A to ground, by closure of external connection 16 of line A to line A' of FIG. 2a, via passage detection output contacts of the Speed and Impulse Translator above referred to for example. This brief input or the brief negative voltage pulse developed at the input circuit of this one-shot multivibrator therefrom is referred to as a "Vehicle Pulse" or passage pulse.

The "Vehicle Passage One-Shop Multivibrator" 1 as illustrated in FIG. 2a is a conventional one-shot multivibrator with the addition of a negative voltage pulse developing input circuit and a voltage dividing output circuit, the latter including resistors 22 and 23, to provide two outputs at different voltage levels.

The input circuit includes the resistors 17 and 18 comprising a voltage divider to provide a voltage of the order of 35 volts positive direct current (D.C.) for example across resistor 18 and the parallel capacitor 19. A low resistance in lead A serves for current limiting and capacitor 19 serves to reduce noise and contact sparking. The connection of line A to ground will shunt resistor 18 and provide a brief negative D.C. voltage pulse from capacitor 24 to the grid of the normally conducting left half of the multivibrator to make this half non-conducting and to make the other normally non-conducting half conducting. This condition will remain for approximately ½ second, for example, as determined by the size of the capacitor between elements of the two tubes in block 1.

The multivibrator in block 1 provides outputs through leads T, F and R. The output through lead T is applied to the "Gating Circuit" block 2 and prevents acceptance of a speed reading except when associated with a vehicle pulse.

Thus with the multivibrator in block 1 in its normal condition with the left tube conducting, i.e. in absence of a vehicle passage pulse, a low positive voltage on lead T holds the "Gating Circuit" 2 conducting to clamp the input of "Critical Speed Threshold Squaring Amplifier" block 4 to keep its left tube section non-conducting and thus its right tube section conducting in the pair 102, despite any speed signal voltage input.

A high positive voltage on lead T during the multivibrator 1 timing in response to a vehicle passage pulse, however, causes the "Gating Circuit" 2 to become nonconductive and unclamps the Squaring Amplifier 4 to allow it to reverse its conduction conditions in response to positive voltage speed signals from line B exceeding the threshold set in adjustment 3. The "Gating Circuit" 2 is connected to block 4 via lead U.

The "Critical Speed Threshold Squaring Amplifier" 4 as shown in FIG. 2a is a conventional squaring amplifier, employing the mono-stable multivibrator pair of triodes 102, only the right section being normally conducting except when and so long as a positive input voltage to the left section makes it alone conducting.

A plus output voltage on lead F from one-shot multivibrator 1 directly operates a "VEH Pulse Indicating Lamp," shown in FIG. 2a and provides, at the terminating of the timed period, a negative going pulse to operate the "Count or Reset Selector" 14. Lead F is a part of the plus return for the "Critical Speed Indicator Lamp," when the "Operation Selector" in block 20 is adjusted for "Below" operation.

The output applied to lead R is a plus pulse at the termination of the timed period which, if the critical speed condition contiues and if the alarm circuits have been engaged by prior critical speed conditions, provides an output pulse to the output alarm circuit to provide pulsed operation of the "Remote Alarm."

Determination that a speed is critical is made through coordination of a "Speed Signal" applied over lead B through the "Critical Speed Adjustment" 3 to the "Critical Speed Threshold Squaring Amplifier" 4 via lead C and non-conduction of the "Gating Circuit" effecting the threshold, block 4, via lead U.

The "Speed Signal" is a plus voltage with respect to ground and is of a value of the order of one volt for each mile per hour. This positive voltage applied on lead B opposes the negative voltage developed in the potential divider of the "Critical Speed Adjustment" block 3. The potential divider includes a network of fixed and adjustable resistors with adjustable resistors in the form of potentiometers. These potentiometers are illustrated as 126, 127 and 128 in FIG. 2a and are shown with potentiometers 127 and 128 connected in series with fixed resistors between a positive voltage (+150 v. D.C.) and a negative voltage (−150 v. D.C.), with potentiometer 126 connected between the positive side of potentiometer 127 and ground. The input D.C. voltage signal representing speed on line B is applied by series resistors in a voltage divider circuit to the adjusting arm of potentiometer 127, where it opposes the negative voltage set at this point. Potentiometer 127 may provide the main adjustment for the preselected speed with potentiometers 126 and 128 providing respectively for calibration of the lower and upper parts of the desired speed range, for example.

If the positive voltage applied on lead B exceeds the negative voltage output of the "Critical Speed Adjustment" 3, the output applied to lead C will be positive. A positive output via lead C will activate the Squaring Amplifier 4 and will thus indicate a speed as critical if the "Gating Circuit" 2 is non-conductive and the "Operation Selector" 20 is adjusted for "Above" operation.

The output of the squaring amplifier, block 4, via lead D is applied to the Operation Selector and, when the Operation Selector is in "Above" position, through switch C′, block 5, to lead H to the "Count Pulse Amplifier" block 8. The Amplifier, block 8, applies a negative pulse via lead J to the "Count Accumulator," block 9. This negative pulse, via lead J will put a count into the count accumulator.

The output via lead D is also applied through the "Above" position of switch D′, block 7, to lead S to the "Not Gate" 11. As shown in FIG. 2a the lead D is connected via voltage reducing resistor 103 to the lefthand or "Above" point of switch D′ in block 7, the resistor 103 forming a voltage divider circuit with resistor 104 to ground.

The output via lead E from squaring amplifier block 4 is applied to "Count or Reset Selector," block 14. This positive pulse overcomes the output of the multivibrator, block 1, as applied to the block 14 via lead F so that there is no output of the Count or Reset Selector applied via lead G to the switches of the Operation Selector block 20.

If the squaring amplifier, block 4 should fail to apply an output via lead E to the selector, block 14, the voltage applied to block 14 via lead F will activate the selector and will cause a positive output to be applied via lead G to the Operation Selector switches.

In the "Above" position of the Operation Selector a positive pulse via lead G will be applied through switch E′, block 6 to lead K. This positive pulse is then applied to the Count Accumulator, block 9, to reset the Count Accumulator.

In the "Below" position of the Operation Selector a positive pulse via lead G will be applied through switch C′, block 5 through lead H, to the Count Pulse Amplifier 8 to activate the amplifier block 8 and apply a negative pulse output, via lead J to the Count Accumulator, block 9 to put a count in the Count Accumulator.

The positive pulse via lead G is also applied to switch D′, block 7 and thence via lead S to the "Not Gate," block 11. As shown in FIG. 2a the lead G is connected via voltage reducing resistor 105 to the righthand or "Below" point of switch D', the resistor 105 forming a voltage divider circuit with resistor 106 to ground.

The "Operation Selector" is a two-position multipole ganged switch, of which switches C', D' and E' are shown in FIG. 1 and FIG. 2a in blocks 5, 6 and 7, respectively. Switches 107 and 108 are shown only in FIG. 2a. This Operation Selector is used to determine whether the functional operation of the present invention is to be the determination and accumulation of a count of consecutive vehicles proceeding past a sampling point above a pre-set or pre-determined speed or the determination and accumulation of a count of consecutive vehicles proceeding past a sampling point below the pre-set and pre-determined speed.

As presented in FIG. 2a, the Operation Selector ganged switches are positioned to the left, which is for the "Above" critical speed operation. The "Critical Speed Indicator Lamp", associated with the ganged switches 107 and 108 in FIG. 2a of the "Operation Selector" indicates properly that a critical speed has been received whether the switches are selecting "Above" operation or "Below" operation.

With the Operation Selector ganged switches set for "Above" operation, as illustrated in FIG. 2a, speeds in excess of the threshold speed pre-selected by adjustment of the adjustable resistor network in the "Critical Speed Adjustment" block 3 will be indicated by a short illumination of the "Critical Speed Indicator Lamp". A positive voltage on lead E from block 4 will cause illumination of the indicator lamp for such critical speed.

With the Operation Selector ganged switches adjusted in the right hand position in FIG. 2a, i.e. for "Below" operation, any speeds below the threshold as pre-selected by adjustment of the "Critical Speed Adjustment" block 3 will be indicated by sustained illumination of the "Critical Speed Indicator Lamp". In the case of "Below" operation, a positive voltage is fed via lead F from one-shot vibrator 1 in response to a passage pulse to illuminate the indicator lamp and if the speed is critical, that is, below the pre-selected speed, the "Critical Speed Threshold Squaring Amplifier" block 4 will not apply a positive output on lead E. The lamp will remain illuminated as the voltage applied via lead F will not be opposed by a voltage applied via lead E to extinguish the lamp. If the speed is in excess of the pre-selected speed, i.e. is non-critical, the squaring amplifier block 4 will apply a positive output via lead E which will oppose the positive output of block 1 via lead F and extinguish the lamp.

In the "Above" position switch C'5 connects the output of the "Critical Speed Threshold" 4, via lead D and lead H to the "Count Pulse Amplifier" 8, and thence via lead J, to the Count Accumulator. As the pulse fed through the "Above" position of switch C'5 terminates, a positive going pulse is fed to the "Count Pulse Amplifier" block 8. This positive going pulse overcomes a fixed bias and causes a negative spike to appear on lead J and via such lead is applied to the "Count Accumulator" 9.

If a vehicle pulse is received and the speed is determined to be not critical, no pulse will appear on lead D, the Count Pulse Amplifier will remain biased to cut-off. A positive voltage from the Critical Speed Threshold Squaring Amplifier will be maintained via lead E to the Count or Reset Selector. At the termination of the timing of the vehicle passage pulse from the multivibrator, block 1, a negative pulse via F is fed to "Count or Reset Selector" 14. This pulse passes through the capacitor in selector block 14 to overcome the normal positive bias from line E and cause the normally conducting triode in block 14 to become non-conducting and thus causes a positive going voltage to be fed through lead G, switch E'6 and lead K to Count Accumulator 9 to reset the Count Accumulator. Two diodes 99 and 99' are provided in the Count Accumulator circuit to prevent internal feedback in the reset circuit.

In FIG. 2a, the "Count Accumulator," block 9 is illustrated as a four-stage binary circuit, including two bi-stable multivibrators or flip-flops. However, it should be understood that additional stages may be added to the "Count Accumulator" or some stages may be deleted, as desired.

Associated with the "Count Accumulator" circuit are several "Consecutive Critical Speed Indicator Lamps." FIG. 2a illustrates four lamps, numbered 0, 1, 2 and 3. The lamp 0 is illuminated when there is no accumulation of critical speed counts. The lamp 1 is illuminated when one critical speed count has been applied and stored in the count accumulator, and the lamp 2 is illuminated when there are two consecutive critical speeds accumulated in the Count Accumulator circuit. Only one lamp is illuminated at a time.

The number of consecutive critical speeds one through four, for example, accepted by the "Count Accumulator" 9 before an alarm is actuated is determined by the setting of the "Successive Count Selector" block 10.

The Successive Count Selector block 10 is illustrated as a four-position switch in FIG. 2a. If additional stages were added to the Count Accumulator, an equal number of positions would be added to the Successive Count Selector.

If the "Successive Count Selector" 10 were adjusted in position 4, for example, as illustrated in FIG. 2a when four successive vehicle critical speeds were accumulated by the Count Accumulator a positive going voltage will appear on one of the leads of the group of leads L to position 4 of the Successive Count Selector.

The positive going pulse from the squaring amplifier block 4 is applied via lead D, switch D' (7) lead S to "Not Gate" 11 providing an unclamping of lead Y to triode controlled "Relay Assembly", block 12. At the same time, a positive going signal is applied via lead M through closed contacts of triode controlled "Relay Assembly", block 13, through lead RM to Relay Assembly block 12, to cause energization of relay PR in Relay Assembly 12 by shifting its associated control triode 113 to conduction by overcoming via line RM the normal cut-off bias derived from potentiometer 112 as illustrated in FIG. 2b.

Energization of this relay block 12 causes closure of certain contacts of relay PR associated with the "Local Alarm Indicator Lamp" shown in FIG. 2b and the "Remote Alarm" block 15 in FIG. 1.

In FIG. 2b in the lower right, the ganged switches, SW1, SW2, SW3 and SW4, illustrated in their uppermost position, are partially represented by a single multi-position switch, SW3 and the single switches SW1 and SW2 in the block diagram of FIG. 1. The switch SW3 in FIG. 1 is illustrated in position d, corresponding to the ganged switches in FIG. 2b, which also are illustrated in position d, the "Hold" position. The position a is illustrated as a "Reset" position, and position b is illustrated as an "Off" position.

In FIG. 1 "Pulse" operation of the Remote Alarm is obtained with the switch SW3 in position c. Power is applied through contacts of Relay Assembly 12 to lead W to position c, through the switch, when in position c, to lead P to the Remote Alarm.

With Relay Assembly 12 energized, negative voltage is applied via lead N to the grid of triode 114 in Relay Assembly 13 to de-energize normally energized relay SR in Relay Assembly 13, so that the "Hold" operation of the Remote Alarm is obtained when the ganged switches are in position d. The Relay Assembly 13 being de-energized holds a negative voltage through the middle contacts of its relay SR and line 116 to maintain the relay SR de-energized, subject to re-set by any positive direct current on line N, the relay SR being controlled by its associated triode 114.

Triode 114 is normally at conducting bias from positive 150 volts direct current, for example when the middle contacts of relay SR are open with relay SR energized, but is switched to cut-off bias to release relay SR upon a negative pulse via line N as above described, and is switched back to conducting bias to energize relay SR again by a positive pulse via line N for reset as further described.

With the Relay Assembly 13 de-energized, alternating current power is applied via closed lower contacts of its relay SR via lead V to the "Hold" position of the selector switch SW3, and via line P to the remote alarm 15 and its associated local indicator lamp.

During de-energization of Relay Assembly 13, alternating current power is applied via momentarily closed contacts of relay PR in Relay Assembly 12 for each subsequent consecutive critical speed received, to lead W to the pulse position c of the ganged switches to pulse the Remote Alarm.

With Relay Assembly 13 de-energized, a pulse from the multivibrator 1 is applied to Relay Assembly 12 via lead R, contacts of Relay Assembly 13 and lead RM to cause Relay Assembly 12 to pulse for each Vehicle Pulse received through lead A.

If a subsequent speed is received that is not critical, the Count Accumulator will be reset via a positive pulse received as output from Count or Reset Selector 14 via lead G, switch E'6, lead K to the Count Accumulator. This positive pulse passes through isolating diodes 99 and 99' associated with the Count Accumulator.

This positive pulse on lead K is also applied through closed switch SW1 via lead N', closed contacts of Relay Assembly 12, lead N" to Relay Assembly 13 to cause energization of Relay Assembly 13. Switch SW1 as closed represents the lower a, b and c positions of the uppermost switch of the ganged switches in FIG. 2b.

It should be noted that lead N in FIG. 2b and N" in FIG. 1 are the same lead but the lead is called N when in FIG. 1 when there is a negative voltage applied via the lead to Relay Assembly 13 and called N" when there is a positive voltage applied via the same lead to Relay Assembly 13.

With switch SW1 open in FIG. 1, i.e. in the upper position d of FIG. 2b, reset of the Count Accumulator by a non-critical speed is permitted without reset of the alarm circuits since diode D1 effectively blocks any reset signal that may be applied from the Operation Selector lead K in the direction of Relay Assembly 13 and the alarm circuits, but reset of both Count Accumulator and Relay Assembly and associated alarm circuits may be obtained by manual reset as by switch SW1 in position a or by Remote Reset 101.

If a subsequent speed is received that is not critical, in the "Above" mode of operation, the Count Accumulator 9 will be reset as described above via a positive pulse received as output from "Count or Reset Selector" 14 via lead G, switch E'6 lead K to the Count Accumulator 9. This positive pulse passes on lead K through the isolating diodes 99, 99' associated with the "Count Accumulator" 9.

This positive pulse on lead K is also applied through closed switch SW1, lead N'; closed contacts of Relay Assembly 12, lead N" to Relay Assembly 13 to cause energization of Relay Assembly 13.

With switch SW1 open in FIG. 1, i.e. in upper position a as shown in FIG. 2b, internal automatic reset of the Count Accumulator 9 is permitted by a non-critical speed without internal reset of the Alarm circuits, as described above. The double-headed arrow on lead K in FIG. 1 indicates dual use of this lead in the sense that the positive pulse for reset may originate from above from internal reset via switch E' in block 6 or from below from manual reset via switch SW2 or Remote Reset pushbutton 101, as further described below.

Thus, as desired internal reset of the Count Accumulator circuits and the alarm circuits may be simultaneously obtained or internal reset of the Count Accumulator circuits may be obtained without internal reset of the alarm circuits.

Reset, whether internal and automatic or external and manual is obtained similarly by applying a positive voltage to the count accumulator and to Relay Assembly 13, as explained with reference to manual reset.

Manual reset of "Count Accumulator" 9 and the alarm circuits is provided for by closure of the Remote Reset button 101. Such closure applies a positive voltage to lead Q, diode D2 to diode D1, or switch SW1, if closed in FIG. 1, and lead N'. The positive pulse applied to diode D1 or SW1 is passed to lead K, through lead K to reset the count accumulator 9. This lead K serves to pass pulses from Operation Selector 20 to switch SW1 to reset the alarm circuits and to pass pulses via diode D1 or switch SW1 to the count accumulator 9.

The positive pulse applied to lead N' is applied through the lower contacts of Relay PR in Relay Assembly 12 to lead N" (lead N in FIG. 2b) to Relay Assembly 13. The positive pulse overcomes the negative voltage holding Relay Assembly 13 deenergized so that the relay SR becomes energized and extinguishes the alarm indicators and opens the alarm circuits.

Switch SW2, when closed in FIG. 1, represents position a of the lowermost of the ganged switches in FIG. 2b and is a local reset switch.

An "Off" position is also provided in position b of the ganged switches, to provide for elimination of the remote alarm output during normal operation of the speed monitoring unit, if desired.

With the Operation Selector 20 adjusted for "Below" operation a monitored speed that is below the pre-selected speed will be considered critical.

As previously described a Vehicle Pulse on lead A, in the form of a negative pulse, sensing the passage of a vehicle is fed into the "Vehicle Passage One-Shot Multivibrator" block 1. This negative pulse activates the one shot multivibrator which produces outputs on leads T, F and R as previously explained. The pulse on lead T unclamps the Gating circuit 2 and, through lead U, prepares Critical Speed Threshold Squaring Amplifier to accept a speed reading. The pulse to the "Count or Reset Selector" 14 is applied via lead F but the "Count or Reset Selector" 14 now serves a somewhat different function from that previously explained.

Let it be assumed that with the Operation Selector adjusted for "Below" operation the speed now monitored is below the pre-selected speed so that the speed will be considered "critical." Since the Speed Signal voltage will be positive and below the amplitude of the negative voltage obtained in the Critical Speed Adjustment, 3, the voltage applied to lead C will be negative. This will hold the squaring amplifier 4 shut off or normal and no voltage pulse will appear on leads D and E from the squaring amplifier 4.

The momentary negative pulse applied to selector 14 via lead F at the end of the timed pulse of the one shot multivibrator 1 will activate the selector 14 and a positive pulse will appear on lead G as previously described. This positive pulse is applied to Switch C', 5, now in the "Below" position, through the "Below" position to lead H to the Count Pulse Amplifier 8.

As previously explained, a negative pulse via lead J is fed from the Count Pulse Amplifier 8 into the "Count Accumulator" 9 where this critical speed is accumulated.

The pulse applied to lead G is also fed into and through the "Below" position of switch D'7 and applied via lead S to Not Gate 11.

As previously explained if the accumulated count of consecutive critical speeds has reached the number of successive counts, as selected by adjustment of the Successive Count Selector 10, a positive pulse will be applied via lead M to Relay Assembly 13 to deenergize the relay SR as previously explained, resulting in activation of the alarm circuits as previously explained.

If the count accumulator has not accumulated the number of consecutive critical speeds as determined by the adjustments of the Successive Count Selector 10 there will be no positive operating pulse on lead M.

Operation of the Alarm circuits, including the Hold and Pulse modes of operation, are similar to that previously explained.

Operation of the Manual local and remote reset circuits are similar to that previously explained.

If the "Speed Signal" on lead B is indicative of a speed that is in excess of the pre-selected speed the monitored speed will be considered not critical in "Below" operation.

With the Operation Selector in the "Below" position let it be assumed that the passage of a vehicle is detected at the sampling station and that the speed of the vehicle is above the pre-selected speed so that the speed will be considered "not critical."

The Vehicle Pulse through lead A will actuate the one shot multivibrator 1 as previously described.

The Gating Circuit 2 will prepare the Threshold 4 to receive a speed signal. Since the Speed Signal on lead B will be positive and a greater amplitude than the negative voltage obtained in the Critical Speed Adjustment 3 a positive voltage will be applied to the squaring amplifier 4 via lead C. This positive voltage will activate the squaring amplifier 4 so that a positive output appears on lead D. This positive output is applied through Switch E'6, now in the "Below" position, to lead K to the Count Accumulator 9 thereby resetting the Count Accumulator circuit.

The alarm circuits may or may not be reset according to the position of switch SW1, as previously explained.

It will be noted that the "Critical Speed Threshold Squaring Amplifier" 4 as shown in FIG. 2a, with its left hand section nonconducting and its right hand section conducting normally in absence of sufficient positive signal on line C and in absence of unclamping via line U, will provide a relatively high output voltage on line D of the order of the 150 volt D.C. plate supply for example and will provide a relatively low voltage on line E which may be of the order of 50 volts positive D.C. for example. These conditions will be reversed upon a speed signal voltage at input B exceeding the threshold. As explained above, these conditions will be reversed upon a speed signal voltage the input B exceeding along the threshold of adjustment unit 3 with a concurrent unclamping via line U of the "Gating Circuit" by multivibrator 1 from a vehicle passage.

The reversal of these conducting conditions in this Squaring Amplifier 4 will reverse the outputs on lines D and E with the line D becoming less positive and therefore having a negative going pulse effect, and the line E going more positive and having a positive going pulse effect.

The tube pair 102 in the Squaring Amplifier 4 will restore to their normal conditions at the end of the combination of the input pulses on lines B and U and such restoration will then provide a positive going pulse on line D and a negative going pulse on line E.

In order to prevent output from appearing on lead G through the Count or Reset Selector 14, a positive going voltage via lead E is applied to Count or Reset Selector 14 just prior to the positive voltage that is applied via lead D, to the Count Accumulator, via lead K both pulses being outputs of the squaring amplifier 4.

The positive going pulse applied to Selector 14 via lead E overcomes the negative going voltage applied via lead F by the multivibrator 1, both these pulses being applied to the Count or Reset Selector 14. This prevents activation of Selector 14 and prevents a positive output from appearing on lead G which would in the Below position, be applied to the Count Accumulator circuit.

Considering further the operation of the "Count of Reset Selector" 14, this selector receives a positive pulse on line E above the normal level of the positive voltage of this line to oppose a negative pulse on line F to prevent the triode in selector 14 from becoming nonconducting and thus to prevent any positive output on line G and consequently to prevent counting in the "Below" operation by a noncritical speed voltage (above the voltage threshold set in block 4), and correspondingly also to prevent reset in the "Above" operation by a critical speed voltage (above the voltage threshold set in block 4).

Although the present invention has been illustrated and described with reference to the accompanying drawings, it will be obvious to those skilled in the art that changes in form, arrangement and connection of various elements and substitution of equipment components may be made without departing from the spirit of the invention within the scope of the appended claims.

We claim:

1. A traffic speed monitoring system for a traffic lane including means for sensing the speeds of individual vehicles in traffic proceeding along said lane and for providing electrical signals having electrical values representative of such individual speeds in succession, means for counting consecutive said electrical signals having electrical values beyond a predetermined threshold value and for resetting such counting in response to any said signal having an electrical value not beyond said predetermined threshold value, and means for providing an output in response to said counting means counting to a predetermined number of such electrical signals having values beyond said predetermined threshold value.

2. A traffic monitoring system as in claim 1 and including remote indicating means controlled by said output.

3. In combination, means for sensing the speeds of individual vehicles in a succession of vehicles in a traffic lane and for producing individual electrical signals having electrical values in a predetermined range representative of such speeds, means for receiving said electrical signals individually and for providing individual electrical pulses therefrom for such electrical values in said range and on one side only of a desired intermediate value within said range, means for counting consecutive such pulses up to a predetermined desired limit and providing an output for a count to said limit, and means for resetting said counting means in response to any such electrical signal having an electrical value on the other side of said intermediate value within said range.

4. A combination as in claim 3 and including means for selectively determining whether said output is so provided for values less than or more than said desired intermediate value.

5. A combination as in claim 3 and in which said means provides an output only for values representing speeds above a desired critical value corresponding to said intermediate value.

6. A combination as in claim 3 and in which said means provides an output only for values representing speeds below a desired critical value corresponding to said intermediate value.

7. A combination as in claim 3 and including an indicator operated in response to said output.

8. A combination as in claim 3 and including an alarm controlled by said output.

9. A combination as in claim 3 and circuit means including an indicator responsive only to such output value when continuous for a predetermined time.

10. A combination as in claim 3 and including indicating means, means for operating said indicating means in response to said output and for holding said indicating means so operated after any termination of said output, said holding means including resetting means for releasing its said holding action.

11. A combination as in claim 3 and including indicating means and associated holding and release switching control means therefor for operating said indicating means in response to said output and for selectively switching between holding said indicator means operated thereafter until reset and releasing said indicator means whenever said output terminates.

12. In combination, means for producing individual electrical values representative of the individual speeds of vehicles in a succession of such vehicles in vehicular traffic, a multi-stage digital counting means for receiving input puses and providing an output in response to a predetermined count thereof and including means for selecting said predetermined count for which said output is provided, means for receiving said individual electrical values and for providing input pulses therefor to said counting means in response to said individual electrical values exceeding a desired predetermined value, and means for resetting said counting means when said electrical value is less than said predetermined value.

13. A combination as in claim 12 and including means for indicating each stage to which said counting has proceeded.

14. A combination as in claim 13 and including means for indicating each input pulse to said counting means.

15. In combination, means for producing individual pulses representing passage of individual vehicles at a desired point in a traffic lane and for producing individual electrical values correlated with said pulses for the corresponding individual vehicles and representative of the speeds of said individual vehicles in a succession of vehicles passing said point, a multi-stage electrical counting means for counting input pulses thereto and for providing an output only in response to a predetermined number of such input pulses, means for receiving said individual electrical values and correlated passage indicating pulses and for providing corresponding input pulses to said counting means only in response to a combination of a passage pulse and a correlated electrical value beyond an adjustable predetermined value corresponding to a desired critical speed, and means for resetting said counting means in response to a passage pulse without a correlated electrical value beyond said predetermined value.

16. A combination as in claim 15 in which said electrical value beyond said predetermined value corresponds to a speed above said critical speed.

17. A combination as in claim 15 in which said electrical pulse beyond said predetermined value corresponds to a speed below said critical speed.

18. A combination as in claim 15 and including means for selectively determining said electrical value beyond said predetermined value as corresponding to a speed below said critical speed and as corresponding to a speed above said critical speed alternatively.

19. Electrical apparatus for use in a system for sensing the speeds of individual vehicles in a succession of vehicles in a traffiic lane and providing individual electrical signals having electrical values representing the speeds of the corresponding individual vehicles, said apparatus including in combination means for receiving said electrical signals and counting consecutive said signals on a particular side of a predetermined intermediate electrical value representing a speed intermediate the usual range of said speeds, means for resetting said counting means in response to any said electrical signal having a value on the other side of said intermediate value, and means for providing an output in response to said counting means counting a predetermined number of said signals.

20. Traffic speed counting apparatus for counting vehicles whose speeds are above or below a predetermined speed as desired comprising, a binary counter having at least two stages in which each stage is capable of two conditions for binary counting, said binary counter including an input means and a reset means; speed signal input means for providing an input signal representative of the speed of vehicles to be counted; first means including an input and first and second output terminals, a threshold signal source, and a signal comparison means connected to the input and the threshold signal source; said first means being connected for supplying the speed signal to the input and for comparing the speed signal with the threshold signal source for providing a comparison signal output at the first output terminal for a speed signal greater than said threshold signal source and for providing a signal at said second output terminal for speed signals less than said threshold signal source, reversing switch means having first and second positions for individually connecting the output of aid first terminal to either the input or reset means respectively of said counter and for connecting the output of said second terminal to the reset or input means respectively of said counter when said switch is in its first and second positions respectively so that in a first position of said switch the counter will count vehicles having speeds above a critical speed as determined by said threshold signal source and will be reset by vehicles having speeds below said critical speed, and in said second switch position the counter will count vehicles having speeds below said critical speed and will be reset by vehicles having speeds above a critical speed.

21. A combination as in claim 20 in which the threshold signal source is adjustable to provide adjustable predetermined speeds.

22. A combination as in claim 20 in which the threshold signal source is an adjustable voltage bias source to provide adjustable predetermined speeds.

23. A combination as in claim 20 in which the first means further includes a multivibrator having an input and two output terminals and further includes a normally conducting amplifier having an input and an output, said compared signal being coupled to the input of the multivibrator, and one of the last named two output terminals corresponding to said first terminal, and the other of said last named two output terminals being connected to said input of said normally conducting amplifier to provide an output therefrom and said latter amplifier output being applied to said second terminal.

24. Traffic speed counting apparatus adapted for receiving vehicle speeds and passage input pulses for counting vehicles whose speeds are above or below a predetermined speed as desired comprising, a binary counter having at least two stages, said binary counter having an input means and a reset means; speed signal input means for receiving an input signal representative of the speed of vehicles to be counted; critical speed threshold comparison means capable of an open and closed condition and having an input, first and second output terminals, and a threshold signal source; a vehicle pulse means for receiving vehicle passage pulses and for generating a control pulse thereby; a gating circuit connected to said critical speed threshold means; said vehicle pulse means connected to said gating means for gating the critical threshold comparison means to its closed condition in response to said control pulse; means to connect the speed signal means to the input of said critical speed threshold comparison means for comparing the speed signal with said threshold signal to produce a compared signal at said first output terminal when said critical threshold comparison means is in its closed condition; a normally conducting amplifier having an input and an ouput; means to connect the vehicle pulse means and the second output terminal of the critical threshold comparison means to the input of the normally conducting amplifier for cutting off said amplifier in the presence of a vehicle pulse alone but remains conducting in the presence of a vehicle pulse and a pulse at the second output terminal; switch means having first and second positions for individually connecting the output of said first terminal to either the input or reset means respectively of said counter and for connecting the output of said normally conducting amplifier to the reset or input means of said counter respectively when said switch is in its first and second positions respectively so that in a first position of said switch the counter will count vehicles having speeds above a predetermined speed as determined by said threshold signal source, and will be reset by vehicles having speeds below said predetermined speed and in said second switch position the counter will count vehicles having speeds below said predetermined speed and be reset by vehicles having speeds above a predetermined speed.

References Cited in the file of this patent

UNITED STATES PATENTS

| | | |
|---|---|---|
| 2,091,357 | Goldsmith | Aug. 31, 1937 |
| 2,150,776 | Moles | Mar. 14, 1939 |
| 2,181,728 | Greentree | Nov. 28, 1939 |
| 2,472,258 | McCleery et al. | June 7, 1949 |
| 2,532,231 | Jarvis | Nov. 28, 1950 |
| 2,621,854 | Sprague et al. | Dec. 16, 1952 |